United States Patent
Swoboda

(10) Patent No.: US 7,788,538 B2
(45) Date of Patent: Aug. 31, 2010

(54) EVENT AND STALL SELECTION

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 376 days.

(21) Appl. No.: 11/383,389

(22) Filed: May 15, 2006

(65) Prior Publication Data
US 2006/0259162 A1 Nov. 16, 2006

Related U.S. Application Data

(60) Provisional application No. 60/681,427, filed on May 16, 2005, provisional application No. 60/681,543, filed on May 16, 2005.

(51) Int. Cl.
G06F 11/00 (2006.01)
(52) U.S. Cl. ...................................................... 714/38
(58) Field of Classification Search .................. 714/28, 714/38
See application file for complete search history.

(56) References Cited

U.S. PATENT DOCUMENTS

| 4,821,170 A | * | 4/1989 | Bernick et al. | ............... | 710/36 |
| 6,112,298 A | * | 8/2000 | Deao et al. | ................... | 712/227 |
| 6,209,126 B1 | * | 3/2001 | Sasaki et al. | ................. | 717/125 |
| 6,343,358 B1 | * | 1/2002 | Jaggar et al. | ................. | 712/227 |
| 6,553,513 B1 | * | 4/2003 | Swoboda et al. | .............. | 714/28 |
| 6,591,369 B1 | * | 7/2003 | Edwards et al. | ............. | 713/400 |
| 2003/0110476 A1 | * | 6/2003 | Aihara | ....................... | 717/135 |
| 2004/0064685 A1 | * | 4/2004 | Nguyen et al. | ............... | 712/227 |
| 2005/0149697 A1 | * | 7/2005 | Enright et al. | .............. | 712/214 |
| 2005/0226242 A1 | * | 10/2005 | Parker | ........................ | 370/389 |

OTHER PUBLICATIONS

"Intel® XScale™ Microarchitecture", Technical Summary, Copyright © Intel Corporation 2000, 13 pp.

* cited by examiner

Primary Examiner—Scott T Baderman
Assistant Examiner—Yair Leibovich
(74) Attorney, Agent, or Firm—Robert D. Marshall, Jr.; W. James Brady; Frederick J. Telecky, Jr.

(57) ABSTRACT

A method comprising generating status signals comprising stall and event information associated with a hardware system. The method also comprises multiplexing logic partitioning the status signals into classes according to one or more user-specified partition criteria.

20 Claims, 3 Drawing Sheets

EVENT AND STALL SELECTION

CROSS-REFERENCE TO RELATED APPLICATIONS

This application claims the benefit of Provisional Application Ser. No. 60/681,543 filed May 16, 2005, titled "Real-Time Monitoring And Profiling System Events," and Provisional Application Ser. No. 60/681,427, filed May 16, 2005, entitled, "Debugging Software-Controlled Cache Coherence," both of which are incorporated by reference herein as if reproduced in full below.

This application also may contain subject matter that may relate to the following commonly assigned co-pending applications incorporated herein by reference: "Real-Time Monitoring, Alignment, and Translation of CPU Stalls or Events," Ser. No. 11/383,361, filed May 15, 2006; "Watermark Counter With Reload Register," Ser. No. 11/383,464, filed May 15, 2006; "Real-Time Prioritization of Stall or Event Information," Ser. No. 11/383,465, filed May 15, 2006; "Method of Translating System Events Into Signals For Activity Monitoring," filed May 15, 2006, Ser. No. 11/383,466; "System and Methods For Stall Monitoring," Ser. No. 11/383,472, filed May 15, 2006; "Monitoring of Memory and External Events," Ser. No. 11/383,473, filed May 15, 2006; "Event-Generating Instructions," Ser. No. 11/383,433, filed May 15, 2006; and "Selectively Embedding Event-Generating Instructions," Ser. No. 11/383,438, filed May 15, 2006.

BACKGROUND

Various testing and debugging software applications may be used to test or debug hardware systems and applications stored on such systems. During the debugging process, the hardware systems and applications on the systems may generate one or more signals (e.g., stalls, events) indicative of a status of the hardware or applications being tested/debugged. In some cases, the number of signals generated may be greater than desired, thus negatively impacting hardware system performance and presenting undesired information to a user of the testing and debugging software applications.

SUMMARY

The problems noted above are solved in large part by techniques for grouping and filtering the signals according to user-specified criteria. An illustrative embodiment includes a method that comprises generating status signals comprising stall and event information associated with a hardware system and multiplexing logic partitioning the status signals into classes according to one or more user-specified partition criteria.

Another illustrative embodiment includes an information carrier medium containing debugging software that, when executed by a processor, causes the processor to receive a selection criterion from a user of the software, transfer the selection criterion to a target system coupled to the processor, and receive from the target system stall or event class information. The stall or event class information is selected from a plurality of classes according to the selection criterion.

Yet another illustrative embodiment includes system comprising circuit logic and multiplexing logic coupled to the circuit logic. The multiplexing logic is adapted to receive a plurality of events and stalls from the circuit logic. The multiplexing logic partitions the events and stalls into classes according to a partition criterion specified by a user.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical or optical connection, or through an indirect electrical or optical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
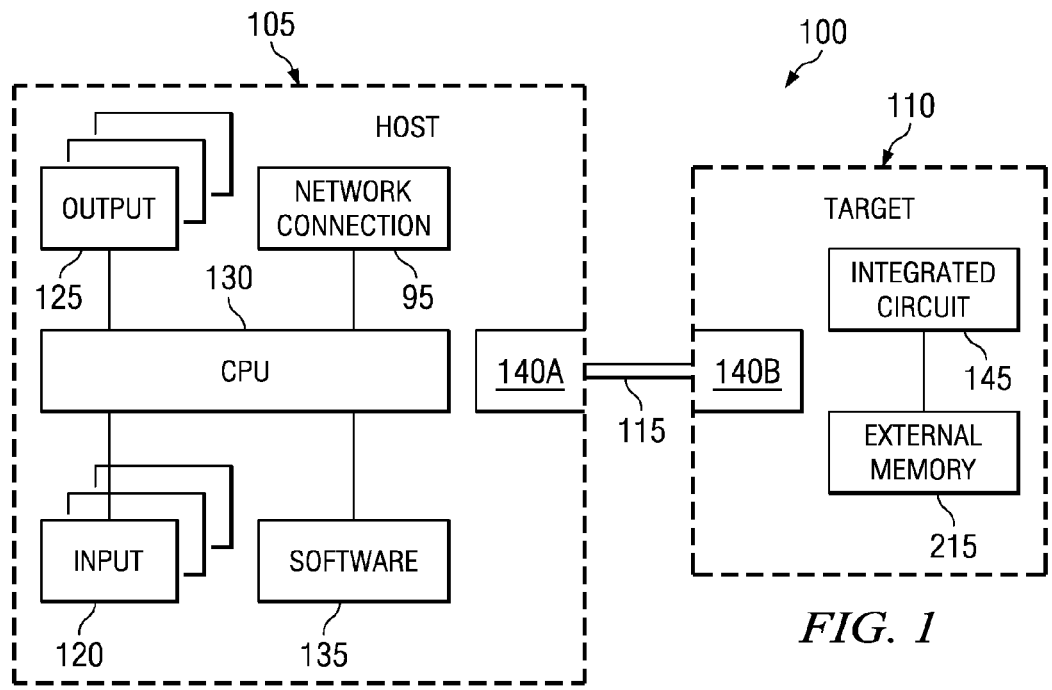
FIG. 1 depicts an illustrative debugging system, in accordance with embodiments of the invention.

FIG. 1 depicts an exemplary debugging system 100 including a host computer 105 coupled to a target device 110 through a connection 115. A user may debug the target device 110 by operating the host computer 105. To this end, the host computer 105 may include one or more input devices 120, such as keyboards, mice, etc., as well as one or more output devices 125, such as monitors and printers. Both the input device(s) 120 and the output device(s) 125 couple to a central processing unit 130 (CPU) that is capable of receiving commands from a user and executing testing/debugging software 135 accordingly. The testing/debugging software 135 may be provided to the host computer 105 in the form of software code delivered using one or more information carrier media. For example, the code may be stored on a compact disc, a flash drive, a floppy disk, etc., or may be provided by way of an Internet download (e.g., from a Website or file transfer protocol (FTP) server). The CPU 130 may communicate with other computer systems by way of the network connection 95 (e.g., Internet or intranet connection).

Connection 115 may be a wireless, hard-wired, or optical connection. In the case of a hard-wired connection, connection 115 preferably is implemented in accordance with any suitable protocol such as a JTAG (which stands for Joint Testing Action Group) type of connection. Additionally, hard-wired connections may include real time data exchange (RTDX) types of connection developed by TEXAS INSTRUMENTS®, INC., or real-time trace. The RTDX and real-time trace provide system developers continuous real-time visibility into the applications that are being developed on the target 110 instead of having to force the application to stop via a breakpoint in order to see the details of the application execution. Both the host 105 and the target 110 may include interfacing circuitry 140A-B to facilitate implementation of JTAG, RTDX, real-time trace or other interfacing standards.

The software 135 interacts with the target 110 and may allow the debugging and optimization of applications that are being executed on the target 110. Debugging and optimization capabilities of the target 110 and the software 135 are discussed in detail below.

The target 110 preferably includes the circuitry (IC) 145 executing assembly language or compiled code being actively debugged. In some embodiments, the target 110 preferably is a test fixture that accommodates the IC 145 when code being executed by the IC 145 is being debugged. This debugging may be completed prior to deployment of the IC 145. For example, if the IC 145 is eventually used in cell phones, then the executable code may be debugged and designed using the target 110.

The IC 145 may include a single integrated circuit or multiple integrated circuits that will be implemented as part of an electronic device. For example, in some embodiments the IC 145 includes multi-chip modules comprising multiple separate integrated circuits that are encapsulated within the same packaging. Regardless of whether the IC 145 is implemented as a single-chip or multi-chip module, the IC 145 may eventually be incorporated into electronic devices such as cellular telephones, portable gaming consoles, network routing equipment, or computers. The IC 145 may couple to memory such as external memory 215.

Figure 2:
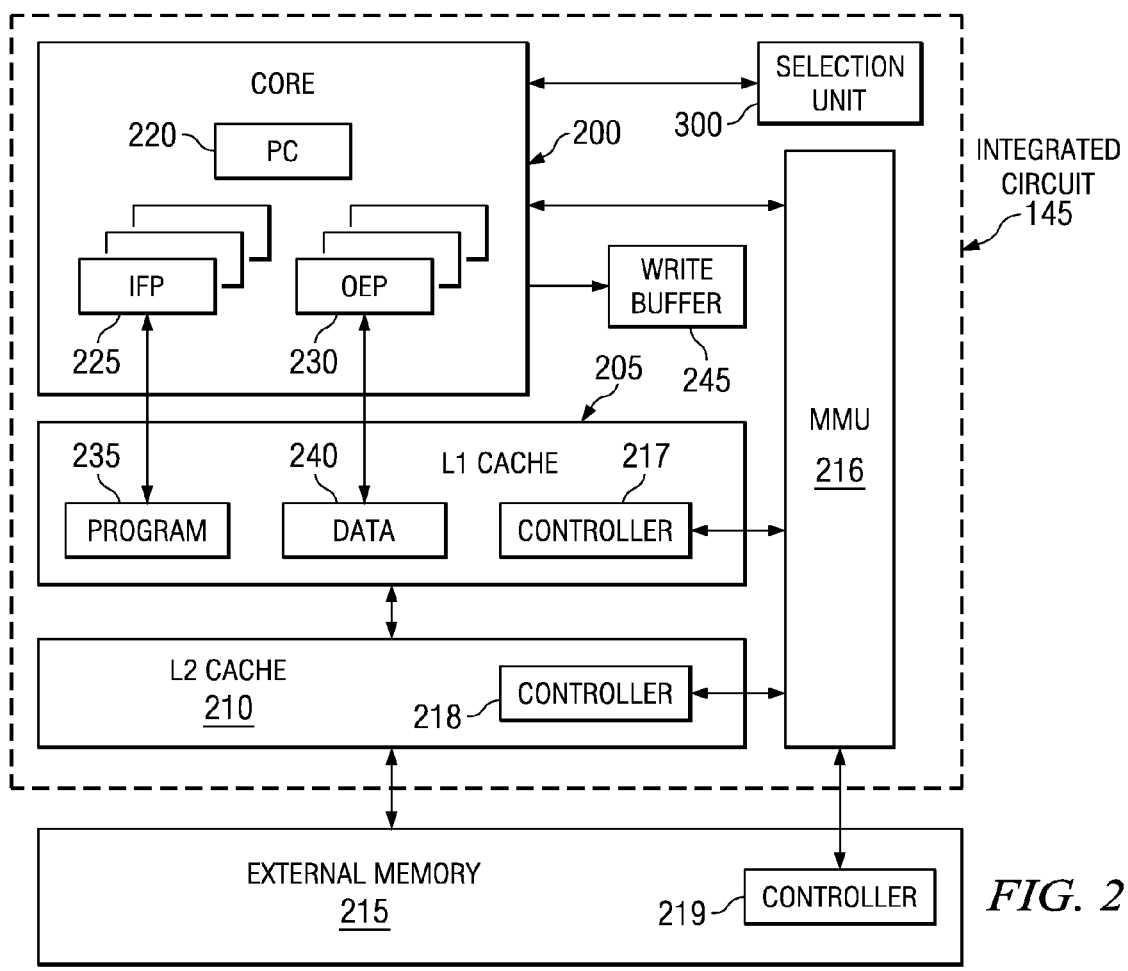
FIG. 2 depicts an illustrative embodiment of the circuitry being debugged, in accordance with embodiments of the invention.

FIG. 2 illustrates an exemplary embodiment of the IC 145 including a processor core 200 coupled to a first level cache memory (L1 cache) 205 and also coupled to a second level cache memory (L2 cache) 210. In general, cache memory is a location for retrieving data that is frequently used by the core 200. Further, the L1 and L2 caches 205 and 210 are preferably integrated on the IC 145 in order to provide the core 200 with relatively fast access times when compared with an external memory 215 that is coupled to the core 200. The external memory 215 is preferably integrated on a separate semiconductor die than the core 200. Although the external memory 215 may be on a separate semiconductor die than the IC 145, both the external memory 215 and the IC 145 may be packaged together, such as in the case of a multi-chip module. Alternatively, in some embodiments, the external memory 215 may be a separately packaged semiconductor die.

The L1 and L2 caches 205 and 210 as well as the external memory 215 each include a memory controller 217, 218, and 219 respectively. The IC 145 of FIG. 1 also comprises a memory management unit (MMU) 216 which couples to the core 200 as well as the various levels of memory as shown. The MMU 216 interfaces between memory controllers 217, 218, and 219 for the L1 cache 205, the L2 cache 210, and the external memory 215 respectively. The core 200 also couples to a selection unit 300, described below.

Since the total area of the IC 145 preferably is as small as possible, the area of the L1 cache 205 and the L2 cache 210 may be optimized to match the specific application of the IC 145. Thus, the L1 cache 205 and/or the L2 cache 210 may be dynamically configured to operate as non-cache memory in some embodiments.

Each of the different memories depicted in FIG. 2 may store at least part of a program (comprising multiple instructions) that is to be executed on the IC 145. As one of ordinary skill in the art will recognize, an instruction refers to an operation code or "opcode" and may or may not include objects of the opcode, which are sometimes called operands.

Once an instruction is fetched from a memory location, registers within the core 200 (not specifically represented in FIG. 2) temporarily store the instruction that is to be executed by the core 200. A program counter (PC) 220 preferably indicates the location, within memory, of the next instruction to be fetched for execution. In some embodiments, the core 200 is capable of executing portions of the multiple instructions simultaneously, and may be capable of pre-fetching and pipelining. Pre-fetching involves increasing execution speed of the code by fetching not only the current instruction being executed, but also subsequent instructions as indicated by their offset from the PC 220. These pre-fetched instructions may be stored in a group of registers arranged as an instruction fetch pipeline 225 (IFP) within the core 200. As the instructions are pre-fetched into the IFP 225, copies of each instruction's operands (to the extent that the opcode has operands) also may be fetched into an operand execution pipeline (OEP) 230.

One goal of pipelining and pre-fetching instructions and operands is to have the core 200 complete the instruction on its operands in a single cycle of the system clock. A pipeline "stall" occurs when the desired opcode and/or its operands is not in the pipeline and ready for execution when the core 200 is ready to execute the instruction. In practice, stalls may result for various reasons such as the core 200 waiting to be able to access memory, the core 200 waiting for the proper data from memory, data not present in a cache memory (a cache "miss"), conflicts between resources attempting to access the same memory location, etc.

Implementing memory levels with varying access speeds (i.e., caches 205 and 210 versus external memory 215) generally reduces the number of stalls because the requested data may be more readily available to the core 200 from L1 or L2 cache 205 and 210 than the external memory 215. Additionally, stalls may be further reduced by segregating the memory into a separate program cache (for instructions) and a data cache (for operands) such that the IFP 225 may be filled concurrently with the OEP 230. For example, the L1 cache 205 may be segregated into an L1 program cache (L1P) 235 and an L1 data cache (L1D) 240, which may be coupled to the IFP 225 and OEP 230 respectively. In the embodiments that implement L1P 235 and L1D 240, the controller 217 may be segregated into separate memory controllers for the L1P 235 the L1D 240. A write buffer 245 also may be employed in the circuitry 145 so that the core 200 may write to the write buffer 245 in the event that the memory is busy to prevent the core 200 from stalling.

In addition to stalls, the IC 145 also may generate multiple event signals. An event signal, or "event," may broadly be defined as a signal indicating that something has occurred within the IC 145. The "something" that precipitates the event may vary. For example, the controller 217 of the L1 cache 205 may generate an event when an L1 cache read hit occurs, or when an L1 cache read miss occurs. Likewise, the controller 217 may generate an event when an L1 cache write hit occurs, or when an L1 cache write miss occurs. The generation of an event also may be precipitated by factors such as cache incoherence issues, processor conflicts, etc. Likewise, the controllers 218 and 219 may generate events for the L2 cache 210 and the external memory 215, respectively. In at least some embodiments, events may be generated by any suitable component of the IC 145 (e.g., the core 200) and/or by circuit logic coupled to the IC 145 or in communication with the IC 145. In some embodiments, events may cause stalls to occur.

Each memory controller 217, 218, and 219 preferably asserts a stall signal to the core 200 when a stall condition occurs with respect to the associated controller. The stall signals notify the core 200 that more than one cycle is required to perform the requested action. Likewise, each memory controller 217, 218 and 219 that generates an event may provide a copy of the event to the core 200. Upon receiving stall and/or event information, the core 200 may take appropriate action.

Referring back to the example of FIG. 1, the software 135 being executed by the host 105 includes code capable of providing information regarding the operation of the target 110. For example, the software 135 provides information to a user of the host 105 regarding the operation of the circuitry 145. This information preferably comprises stall and event information. The information may describe various aspects of each stall and/or event, such as the type of stall or event, where the stall or event was generated, etc. The scope of disclosure is not limited to transferring any specific type or amount of information to the host 105.

Figure 3:
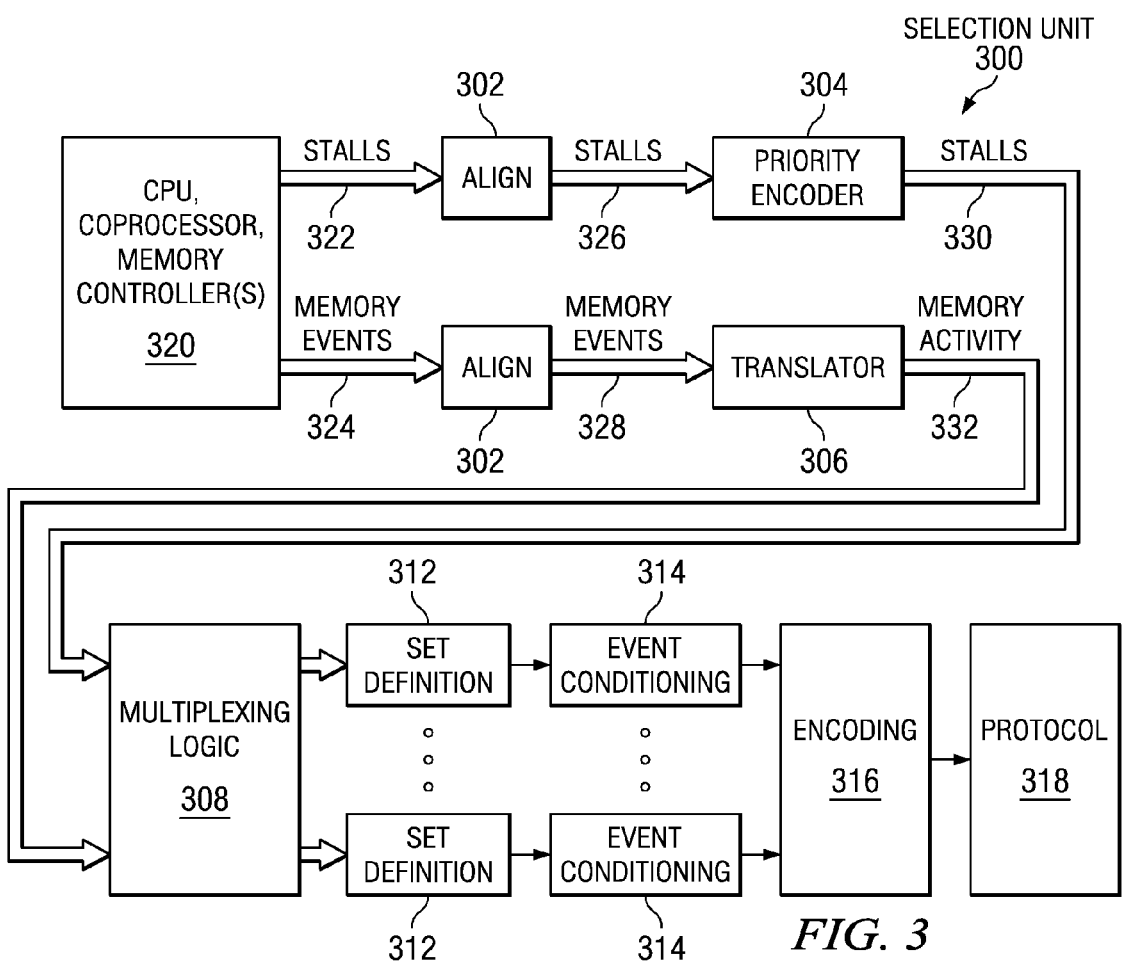
FIG. 3 depicts an illustrative embodiment of event and stall selection hardware in accordance with embodiments of the invention.

FIG. 3 shows a selection unit 300 whereby user-specified stall and/or event information is transferred from the IC 145 to the host 105. More specifically, the software 135 enables the user of the host 105 to specify stall and event partition and selection criteria. The software 135 causes the CPU 130 to provide the partition and selection criteria to the IC 145, and more specifically, to the unit 300. The unit 300 then uses the user-specified partition criteria to partition received stalls and events into stall classes and event classes. The unit 300 uses the selection criteria to filter the stall and event classes to provide to the host 105 information that meets the selection criteria.

The selection unit 300 comprises a plurality of alignment modules 302, a priority encoder 304, a translator 306, programmable selection multiplexing logic 308, a plurality of set definition modules 312, a plurality of event conditioning modules 314, an encoder 316, and a protocol module 318. Component 320 is representative of any logic or component of the IC 145 that generates a stall or event, such as the core 200 or any of the controllers 217-219. Stalls 322 are provided from the component 320 to one of the alignment modules 302, and memory events 324 are provided from the component 320 to another one of the alignment modules 304. Although the figure shows the stalls 322 and the events 324 as being generated by a common component 320, in at least some embodiments, the stalls 322 and the events 324 may be generated by different components. For example, stalls 322 may be generated by the controller 217 and events 324 may be generated by the controller 218. Likewise, at least a portion of the stalls 322 may be generated by a different component than a remainder of the stalls 322. Similarly, different portions of the events 324 may be generated by different components of the IC 145 or circuit logic coupled to the IC 145.

Stalls and events provided to the alignment modules 302 by the component 320 may be unaligned. The alignment modules 302 align the stall or event with the instruction(s) associated with that stall or event. Thus, for example, one of the alignment modules 302 may align a misaligned event with the instruction that precipitated that event.

Aligned stalls 326 are forwarded to the priority encoder 304, and aligned events 328 are forwarded to the translator 306. The priority encoder 304 encodes received stalls to produce encoded stalls 330. The translator 306 receives events and translates the events into more meaningful event signals 332. The translator 306 also may be thought of as an interpreter which interprets various events. For example, the translator 306 may be programmed to recognize a particular combination of events as indicative of a broader-level event. In turn, the translator 306 may generate one or more signals indicative of this broader-level event.

The multiplexing logic 308 is programmed with class partition criteria which the multiplexing logic 308 uses to partition various stalls and events into classes. Various types of classes are within the scope of disclosure. Examples of such classes include CPU/core classes which contain stalls and/or events associated with the core 200; memory system classes, which contain stalls and/or events associated with one or more of the system caches 205, 210 and/or 215 and external memory 215; general system classes, bus switch classes, and state machine classes. The scope of disclosure is not limited to these classes, and other classes also may be used. Some classes may contain only stalls, while other classes contain only events, and still yet other classes contain both stalls and events. The multiplexing logic 308 also is programmed with user-specified selection criteria which the multiplexing logic 308 uses to filter the stall and event classes.

Figure 4:
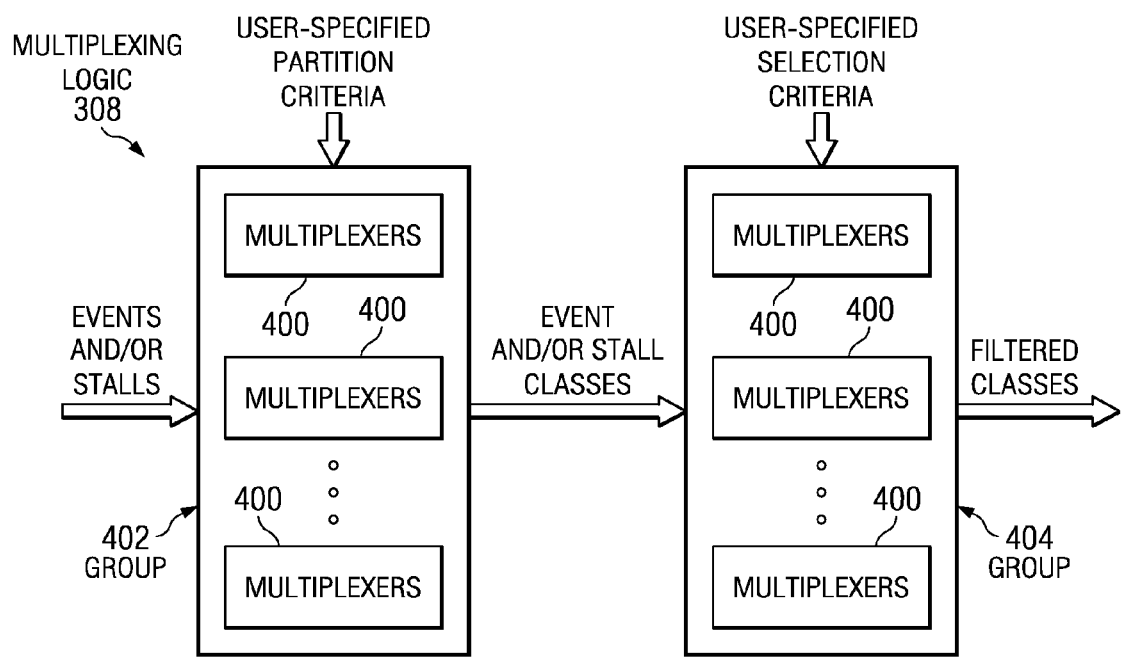
FIG. 4 provides a detailed view of some of the hardware of FIG. 3, in accordance with embodiments of the invention.

Accordingly, when the multiplexing logic 308 receives stalls and/or events, the multiplexing logic 308 preferably partitions at least some of the stalls and/or events into such classes using the user-specified partition criteria, and subsequently uses the user-specified selection criteria to output those classes meeting the selection criteria. Referring to FIG. 4, in at least some embodiments, the multiplexing logic 308 comprises a plurality of programmable multiplexers 400. As shown, the multiplexers 400 may be divided into two groups 402 and 404. The group 402 comprises multiplexers which receive a plurality of stalls and/or events and which partition the stalls and events into stall classes and event classes. The multiplexers in group 402 preferably partition the stalls and events into classes according to the user-specified partition criteria programmed into the multiplexers.

Once partitioned into classes, the stall classes and event classes may be transferred to programmable multiplexers in the group 404. The multiplexers of group 404 receive the stall and event classes (i.e., groups of stalls and events) and filter the classes according to user-specified selection criteria programmed into the multiplexers. In some embodiments, the multiplexers of group 404 allow only those classes meeting the selection criteria to be output. In other embodiments, the multiplexers of group 404 allow only those classes not meeting the selection criteria to be output. Any number of classes may be output by the multiplexing logic 308.

The operation of the multiplexing logic 308 as described above is illustrative of some embodiments of the invention. The scope of disclosure is not limited to this or any other specific method of operation for the multiplexing logic 308. Any configuration of the logic 308 which partitions and filters the stalls and events in accordance with embodiments of the invention may be used.

Referring again to FIG. 3, stall and/or event classes output by the multiplexing logic 308 are grouped into sets by the set definition modules 312. Once grouped into sets, the stall and/or event classes then are event-conditioned by the event conditioning modules 314. The condition stall and/or event classes then are processed by the encoder 316 and the protocol module 318 for transfer to the host 105. Specifically, the encoder 316 encodes the classes for transfer to the host 105 and the protocol module 318 manipulates the classes in accordance with one or more preferred transfer protocols. The scope of disclosure is not limited to adjusting or manipulating the classes as described above. Any suitable adjustments may be performed.

Once the selected classes have been processed by the protocol module 318, the classes are transferred from the target 110 to the host 105 via connection 15 (FIG. 1). The CPU 130 receives the selected classes and prepares the classes for display using an output device 125. The user of the host 105 may observe the display and make modifications using an input device 120. The modifications (e.g., adjustment of partition criteria or selection criteria) are transferred to the target 110 and are programmed into the programmable multiplexing logic 308.

The host 105 also may store the received classes to a suitable storage device, such as a hard disk, a floppy disk, a flash drive, a compact disc, etc., none of which are specifically shown. The filtered classes also may be transferred to another computer communicably coupled to the host 105 by way of the network connection 95.

Figure 5:
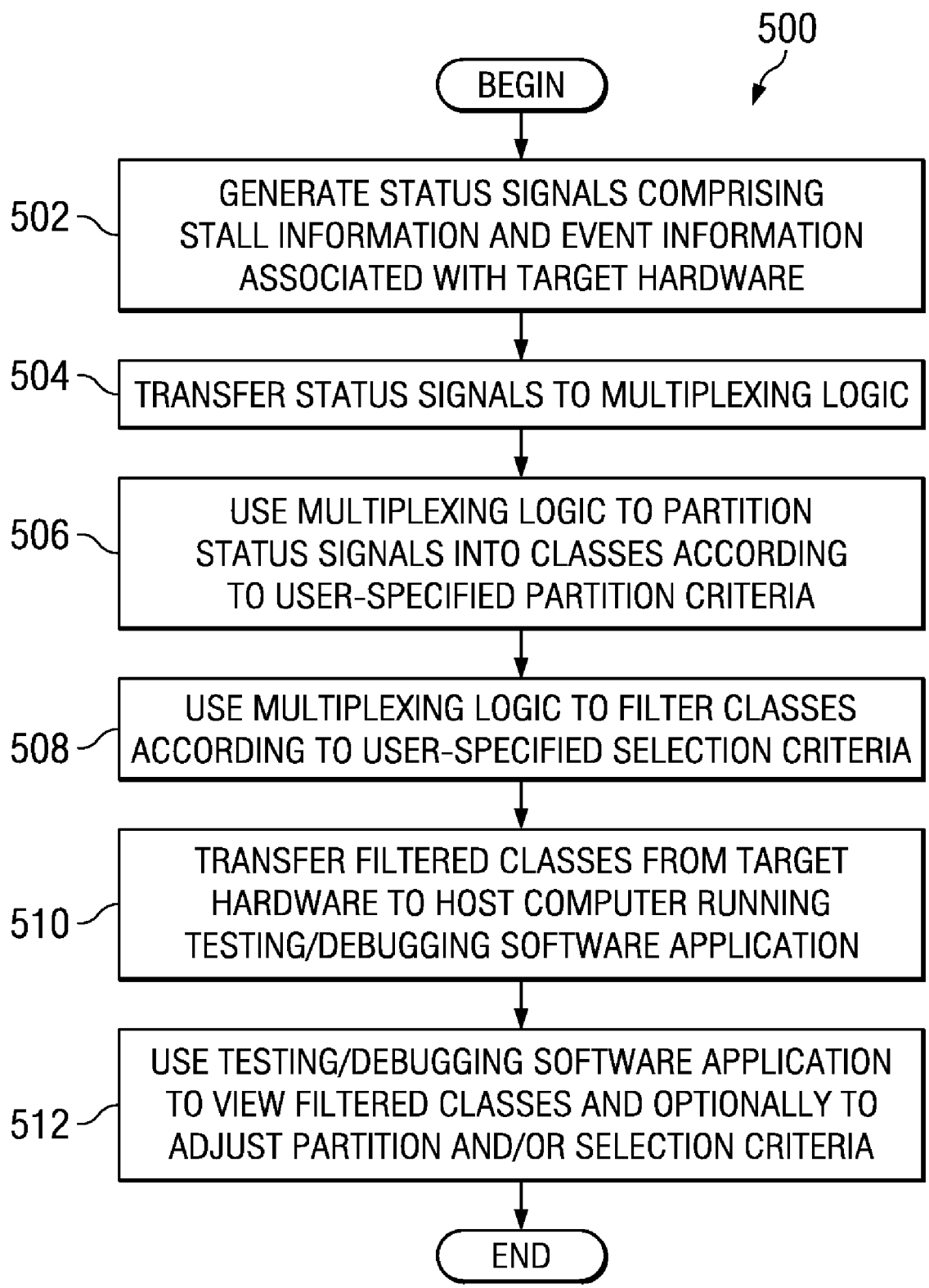
FIG. 5 depicts a flow diagram of a technique implemented in accordance with embodiments of the invention.

FIG. 5 shows a flow diagram of an illustrative method 500 implemented in accordance with embodiments of the invention. The method 500 begins by generating status signals comprising stall information and event information associated with the target hardware 110 (block 502). The method 500 continues by transferring the status signals to a multiplexing logic within the target hardware 110 (block 504). The multiplexing logic partitions the status signals into classes according to user-specified partition criteria (block 506). The multiplexing logic filters the classes according to user-specified selection criteria (block 508). The method 500 further comprises transferring the filtered classes from the target hardware 110 to the host 105 running the testing/debugging software 135 (block 510). The method 500 also comprises using the software 135 to view the filtered classes and optionally adjusting the partition and/or selection criteria (block 512). A user of the software 135 may adjust neither of the criteria, the partition criteria, the selection criteria, or both of the criteria.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   generating status signals comprising stall and event information associated with a hardware system, stall information is indicative of a condition that causes a processor pipeline stall; and
   multiplexing logic partitioning the status signals into stall classes and event classes according to one or more user-specified partition criteria.

2. The method of claim 1 further comprising the multiplexing logic filtering the stall and event classes according to one or more user-specified selection criteria to produce filtered stall and event classes.

3. The method of claim 2 further comprising transferring said filtered classes to a host computer coupled to the hardware system and displaying said filtered classes on a host computer display.

4. The method of claim 2 further comprising transferring said filtered classes to a host computer coupled to the hardware system and storing the filtered classes on a host computer storage.

5. The method of claim 1, wherein partitioning the signals into the classes comprises using classes selected from the group consisting of processor classes, memory system classes, general system classes, bus switch classes and state machine classes.

6. The method of claim 1 further comprising receiving the partition criteria from a software application executed by a processor coupled to the hardware system.

7. An information medium that stores debugging software that, when executed by a processor, causes the processor to:
   receive stall and event selection criteria from a user of the software;
   transfer said stall and event selection criteria to a target system coupled to the processor; and
   receive from the target system stall and event class information, said stall and event class information selected from a plurality of stall and event classes according to said selection criteria;
   wherein the stall class information is indicative of a condition that causes a processor pipeline stall.

8. The information medium of claim 7, wherein the debugging software further causes the processor to:
   receive stall and event partition criteria from said user; and
   transfer said stall and event partition criteria to the target system;
   wherein the plurality of stall and event classes are organized according to said partition criteria.

9. The information medium of claim 8, wherein the stall and event partition criteria is applied to organize the plurality of stall and event classes before the stall and event class information is selected from the plurality of stall and event classes.

10. The information medium of claim 7, wherein the debugging software causes the processor to display said stall and event class information via a display coupled to the processor.

11. The information medium of claim 7, wherein the debugging software causes the processor to store said stall and event class information to a storage device coupled to the processor.

12. The information medium of claim 7, wherein the debugging software causes the processor to transfer said stall and event selection criteria to a multiplexing logic stored on the target system.

13. A system, comprising:
    circuit logic; and
    multiplexing logic coupled to the circuit logic, said multiplexing logic adapted to receive a plurality of events and stall condition signals from the circuit logic;
    wherein each stall condition signal is indicative of a processor pipeline stall;
    wherein the multiplexing logic partitions the events and stall condition signals into event classes and stall classes according to partition criteria specified by a user.

14. The system of claim 13, wherein the multiplexing logic outputs one or more classes meeting a selection criterion specified by the user and not classes which fail to meet the selection criterion.

15. The system of claim 14, wherein the multiplexing logic outputs said one or more classes to another system coupled to said system, said another system adapted to store the one or more classes, to display the one or more classes, and to transfer the one or more classes to a different system.

16. The system of claim 13, wherein the classes are selected from the group consisting of processor classes, memory system classes, general system classes, bus switch classes and state machine classes.

17. The system of claim 13, wherein the partition criterion is adjustable.

18. The system of claim 13, wherein circuit logic comprises a memory system that generates the events and stall condition signals.

19. The method of claim 1, further comprising generating the stall and event information in a memory system.

20. The information medium of claim 7, wherein the debugging software causes the processor to display a type of a stall, a type of an event, a location where the stall was generated, and a location where the event was generated.

* * * * *